United States Patent [19]

Berg

[11] Patent Number: 4,772,230

[45] Date of Patent: Sep. 20, 1988

[54] PLASTIC PLUGS AND RECEPTACLES REINFORCED WITH CURED RESIN COATED GLASS CLOTH

[75] Inventor: Arthur H. Berg, Fabius, N.Y.

[73] Assignee: Cooper Industries, Inc., Houston, Tex.

[21] Appl. No.: 902,105

[22] Filed: Aug. 29, 1986

Related U.S. Application Data

[60] Continuation of Ser. No. 662,514, Oct. 19, 1984, abandoned, which is a division of Ser. No. 335,543, Dec. 29, 1981, Pat. No. 4,499,039.

[51] Int. Cl.⁴ .................................................. H01R 13/53
[52] U.S. Cl. ...................................... 439/736; 264/257
[58] Field of Search ................................ 264/257, 258; 339/218 R, 218 M; 439/736, 934

[56] References Cited

U.S. PATENT DOCUMENTS

| | | | |
|---|---|---|---|
| 2,138,882 | 12/1938 | Robie | 51/280 |
| 2,495,640 | 1/1950 | Muskat . | |
| 2,526,945 | 10/1950 | Gray | 154/1 |
| 2,614,058 | 10/1952 | Francis | 154/83 |
| 2,749,266 | 6/1956 | Eldred | 264/137 |
| 2,949,642 | 8/1960 | Lieberman | 18/59 |
| 3,087,201 | 4/1963 | Williams et al. | 18/59 |
| 3,093,160 | 6/1963 | Boggs | 138/140 |
| 3,137,750 | 6/1964 | Gringras | 264/257 |
| 3,202,749 | 8/1965 | White | 264/250 |
| 3,284,258 | 11/1966 | Patti et al. | 156/84 |
| 3,341,211 | 9/1967 | Houghton et al. | 264/257 |
| 3,397,639 | 8/1968 | Alderfer | 264/257 |
| 3,494,998 | 2/1970 | Anhalt | 339/218 R |
| 3,537,061 | 10/1970 | Haag et al. | 339/31 |
| 3,594,696 | 7/1971 | Witek, Jr. | 339/60 |
| 3,609,630 | 9/1971 | Francis | 339/14 R |
| 3,765,500 | 10/1973 | Reeves | 180/77 TC |
| 3,781,986 | 1/1974 | Joslyn et al. | 29/630 D |
| 3,843,759 | 10/1974 | Keeham | 264/135 |
| 3,975,479 | 8/1976 | McLean | 264/102 |
| 4,041,240 | 8/1977 | Sipowicz | 174/151 |
| 4,072,381 | 2/1978 | Burkhart et al. | 339/29 R |
| 4,088,525 | 5/1978 | Gowetski et al. | 156/173 |
| 4,092,058 | 5/1978 | Eigenbrode | 339/218 M |
| 4,123,488 | 10/1978 | Lawson | 264/137 |
| 4,193,657 | 3/1980 | Slone | 339/63 M |
| 4,241,976 | 12/1980 | Oliver et al. | 339/278 D |
| 4,271,343 | 6/1981 | Danchin | 200/304 |
| 4,298,556 | 11/1981 | Rutsch et al. | 264/257 |
| 4,353,862 | 10/1982 | Kaman, II | 264/257 |
| 4,364,887 | 12/1982 | Becht et al. | 264/258 |
| 4,372,900 | 2/1983 | Doerfling | 264/258 |
| 4,398,785 | 8/1983 | Hedrick | 264/255 |
| 4,401,841 | 8/1983 | Meyer et al. | 174/31 R |

FOREIGN PATENT DOCUMENTS 2543476  4/1977  Fed. Rep. of Germany .
51-6071  2/1976  Japan .

Primary Examiner—Gil Weidenfeld
Assistant Examiner—Gary F. Paumen
Attorney, Agent, or Firm—Finnegan, Henderson, Farabow, Garrett & Dunner

[57] ABSTRACT

A reinforced protective housing that may be utilized for protection of electrical contacts; such housing is reinforced with cured resin-coated open mesh glass cloth. Electrical contacts are incorporated into the glass cloth reinforced plastic body to form a unitary electrical connector component. A method of manufacturing cured resin-coated open mesh glass cloth reinforced molded plastic electrical connectors.

23 Claims, 1 Drawing Sheet

PLASTIC PLUGS AND RECEPTACLES REINFORCED WITH CURED RESIN COATED GLASS CLOTH

This application is a continuation of application Ser. No. 662,514, filed Oct. 19, 1984, now abandoned, which is a division of application Ser. No. 335,543, filed Dec. 29, 1981, issued as U.S. Pat. No. 4,499,039 on Feb. 12, 1985.

BACKGROUND OF THE INVENTION

1. Field of the Invention

The present invention relates to protective housings and to heavy duty industrial plastic electrical connectors including electrical contacts located in composite plastic bodies. More particularly, the invention is directed to reinforced composite plastic housings and to reinforced composite plastic electrical connectors which withstand mechanical abuse and exposures to corrosive chemical environments and to a method for manufacturing such electrical connectors.

2. Description of the Prior Art

Conventional commercially available industrial heavy duty electrical connector units include plugs and receptacles with a metal protective body for the electrical contacts and a plastic electrical insulating section for separation of the electrical contacts. The metal protective body is conveniently given a suitable surface treatment or coating to retard corrosion that is met in use. Industrial heavy duty electrical connectors are used for distribution of electrical power to electrically operated devices such as motors, generator sets, compressors, heating and cooling units, welders, conveyors, lighting systems and similar equipment. These connectors are used indoors and outdoors and in hazardous and nonhazardous areas of, for example, chemical and petrochemical plants, process industry facilities, oil drilling platforms, aerospace facilities, marine locations and the like. Materials used for manufacturing such electrical connectors must be able to withstand environmental and abuse exposures so as to minimize damage to the connector and to maximumze safety in operation after such exposures. The use of a metal protective body in conventional heavy duty electrical connectors has several drawbacks including expensee, excess weight, susceptability of the metal to corrosive attack and the requirement of separate insulating sections because of metal's poor insulating properties.

Plastics have been under investigation as a replacement for metal protective bodies in conventional commercial heavy duty electrical connectors. Plastics are desirable because of their well known resistance to corrodents which attack metals, they have good electrical insulating proerties, they are light weight, and are relatively inexpensive.

The use of plastics, however, in heavy duty electrical connectors has previously met with problems. These problems have arisen due to the notch sensitivity and excessive deformation under load of non-reinforced thermoplastic resins, to the brittle fracture characteristics of both fiber-reinforced plastics and filled thermosetting resin materials and to the reduction of mechanical properties and/or dimensional integrity of most thermoplastic resins on exposure to aggressive chemicals and gases met in hazardous location use.

Production of thermoplastic electrical connectors for light duty use is well-known in the art. U.S. Pat. No. 3,494,998 to Anhalt, for example, discloses a method of connector manufacturing utilizing thermoplastic materials to surround the electrical element and form the body of the connector. Such conventional plastic electrical connectors, however, are not suited for heavy duty use because of their notch sensitivity, excessive deformation under load and their low resistance to aggressive chemical environments.

SUMMARY OF THE INVENTION

It is therefore an object of the present invention to provide a reinforced protective housing and a suitable industrial heavy duty plastic electrical connector which overcomes the aforementioned disadvantages of previous plastic electrical connectors. The invention provides electrical connectors that provide greater resistance to environmental corrosion and abuses in use and subsequently provide greater safety from electrical hazards than heretofore available. It is further an object of the present invention to provide a method of manufacturing such heavy duty plastic electrical connectors.

It is another object to provide heavy duty electrical connectors and a method of manufacturing such connectors which are lighter in weight and are more corrosion resistant than conventional heavy duty electrical connectors which incorporate a metal protective body.

Additional objects and advantages of the invention will be set forth in part in the description which follows and in part will be obvious from the description, or may be learned by practice of the invention. The objects and advantages of the invention are realized and obtained by means of the materials, methods and the combinations particularly pointed out in the appended claims.

To achieve the objects in accordance with the purpose of the invention, as embodied and broadly described herein, the invention comprises a molded plastic body and a resin-coated open mesh glass cloth reinforcement for said molded plastic body. The open mesh glass cloth is resin-coated with a cured thermosetting resin which substantially maintains the relative positions of the glass fibers in the open mesh glass cloth reinforcement. In a preferred embodiment the composite plastic housing comprises a molded plastic as a major constituent by volume and a resin coated open mesh glass cloth reinforcement as a minor constituent by volume. The invention also relates to the incorporation of the above reinforced molded plastic body into an electrical connector unit comprising electrical contacts located in the composite plastic body. In a preferred embodiment the composite plastic body of the electrical connector unit comprises a molded plastic as a major constituent by volume and a resin coated open mesh glass cloth as a minor constituent by volume.

As embodied and broadly described herein, the invention also comprises a method of manufacturing the electrical connectors of the invention. The electrical connectors are manufactured according to a process wherein first an open mesh glass cloth is treated with an uncured thermosetting resin coating. The resin coating is applied in an amount which ranges between 20 and 50% of the weight of the coated cloth. The resin-coated open mesh glass cloth is shaped by wrapping the cloth about a mandrel. The cloth is then overwrapped with a release film under tension. The thermosetting resin coating is then cured to an insoluble and infusible state. The cured resin coated open mesh glass cloth reinforcement is placed on a cored section of an open mold which may or may not be fitted with electrical contacts.

The mold is closed in a machine suited to inject a plastic material into the mold. A plastic material is injected under heat and pressure into the mold cavity on and about the shaped open mesh glass cloth reinforcement. The molded electrical connector and/or receptacle having the reinforcement molded in is then removed from the mold.

It is to be understood that both the foregoing general description and the following detailed description are exemplary and explanatory only and are not intended to be restrictive of the invention, as claimed.

The accompanying drawings, which are incorporated in and constitute a part of the specification, illustrate an example of a preferred embodiment of the invention and together with the description serve to explain the principles of the invention.

DETAILED DESCRIPTION OF THE INVENTION

Reference will now be made in detail to the present preferred embodiments of the invention, examples of which are illustrated in the accompanying drawings.

Figure 1:
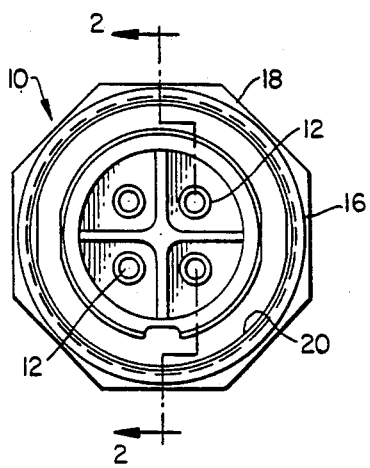
FIG. 1 is a front view of the plug component of the electrical connector of the invention showing the connector socket contacts.

FIG. 1 is a front view of the plug components of the electrical connector of the invention. The plug component numbered generally as 10, includes the conventional connector electrical contacts 12 fixed in a housing 16, shown in more detail in the cross-sectional view of FIG. 2. The housing includes a hollow cylindrical section 16 in which the contacts 12 and coupling nut 18 are located as well-known in the art. The contacts 12 include hollow socket portions at their outer ends, the socket portions being of varying depths or receiving complementary current-carrying elements of the receptacle as also known in the art.

The housing 16 is also provided with the customary elements for connecting the contact pins 12 heavy duty wires or cables.

In the plug connector 10 of the invention the housing 14 is fabricated of plastic and the contact pins 12 are molded in the plastic.

In accordance with the invention, cured resin-coated open mesh glass cloth 20 is molded into the inner curved surface of the molded plastic cylindrical housing section 16. Additionally, cured resin-coated open mesh cloth 22 is molded into the inner threaded surface of the coupling nut 18, as shown in detail in FIGS. 5 and 6. The molding of the cured resin-coated open mesh glass cloth into the inner curved surface of the cylindrical section 16 and the coupling nut 18 will be described in detail hereinafter.

Figure 3:
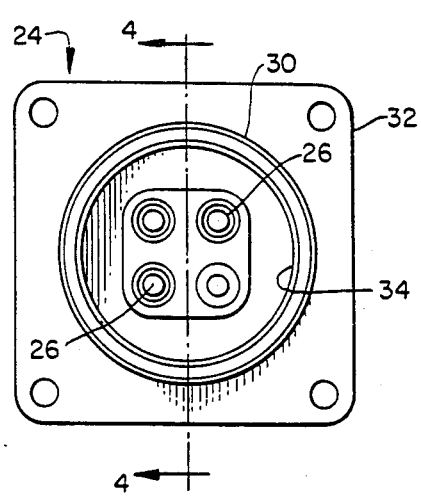
FIG. 3 is a front view of the receptacle component of the electrical connector of the invention showing the connector pin contacts.
Figure 4:
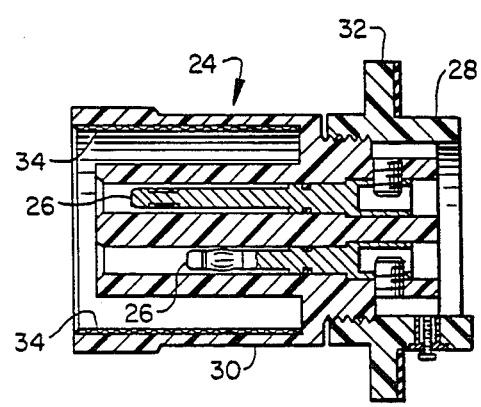
FIG. 4 is a cross-sectional view of the receptacle component taken along line 4—4 of FIG. 3.

FIG. 3 is a front view of the receptacle component of the electrical connector of the invention. The receptacle component, numbered generally as 24, includes conventional connector contact-carrying pin contacts 26 fixed in a molded plastic housing 30, shown in more detail in the cross-sectional view of FIG. 4. The housing includes a hollow molded plastic cylindrical section 30 in which the electrical contact pins 26 are located. The inner diameter of section 30 is dimensioned to receive the cylindrical section 16 of the plug component 10, the socket contacts 12 being inserted into the contact-carrying pin contacts 26 as known in the art.

As mentioned above, the hollow contact pins 12 receive the complementary current-carrying elements of the receptacle, the varying depths of the hollow sockets serving to orient properly the polarization of the pins, as also known in the art.

The housing 28 also includes the conventional flange 32 for attaching the receptacle to a proper mount and the customary elements for connecting the current-carrying pins 26 to heavy duty wires or cables. In the receptacle 24 of the invention, the housing 28 is fabricated of plastic and the contact-carrying pins are fixed in the housing.

In accordance with the invention, cured resin-coated open mesh cloth 34 is molded into the inner curved surface of the cylindrical section 30.

The integrally molded-in cured resin-coated glass cloth serves as a reinforcement to those parts of the electrical connector most prone to damage from excessive crush and impact loadings. Break-out of sections of the plug and receptacle is thus prevented. Greater operator safety will result because mispolarization of the reinforced plug and receptacle after abuse becomes virtually impossible.

The reinforced heavy duty plastic electrical connectors of the present invention provide several benefits not found in commercially available industrial heavy duty electrical connectors. First, the composite plastic bodies are not prone to corrosion and weakening due to the effects of the environment. The reinforced plastic structure has high impact strength, is able to withstand abuse and is crush resistant all of which are prerequisites for industrial use. These features of durability are important to resist break-out of loose pieces of the component parts of the connector which could reduce the protection accorded to electrical contacts in the connectors and cause a short circuit or hazard of electrical shock.

Further advantages of the present invention over conventional industrial heavy duty electrical connectors which utilize metal protective housings are that the plastic electrical connectors of the present invention are lighter in weight and may use less expensive materials than the coated metal kind. The reinforced plastic walls of the present invention have high impact strength and are resistant to crushing and physical abuse because of the support which the cured coated open mesh glass cloth gives to the molded plastic body when it is incorporated within the body according to the process of the present invention.

The presently preferred components of the invention will now be described in detail. First, the open mesh glass cloth used is one wherein the percentage by volume of the glass fibers in the glass cloth is not greater than 50% by volume of the glass cloth and the tensile strength of the open mesh glass cloth is greater than 100 pounds per inch. The preferred range of the percentage by volume of the glass fibers within the open mesh glass cloth falls in the range of from 15 to 40 percent of fibers to the total volume of the glass cloth. Percent by volume of the glass fibers in glass cloth is established first by determining the volume of fibers in the cloth. This is done by dividing the weight in grams of the glass cloth by the specific gravity of glass. The volume of glass fibers so determined is divided by the volume of the glass cloth in cubic centimeters and multiplied by 100 to give the percent by volume of the glass fibers in the cloth. Glass cloths with various weaves are available commercially and are designated as "plain weave," "leno weave" and "basket weave".

The open mesh glass cloth has a thermosetting resin coating on it which has been cured prior to being molded into the plastic electrical connector. The cured thermosetting resin coating is a coating of thermosetting resin which has been chemically converted to an insoluble and infusible state. Typically thermosetting type resins suited for use as coatings for the open mesh glass cloth are phenol-formaldehyde, epoxy, diallyl phthalate, unsaturated polyesters, urea-formadehyde, melamine-formaldehyde resins and the like. The preferred thermosetting type resin coatings for the open mesh glass cloth are the phenol-formaldehyde, epoxy and unsaturated polyester resins. The thermosetting resin coating is present on the open mesh glass cloth in the range between 20 and 50 percent by weight of the coated cloth. The preferred amount of coating is between 25 and 45 percent by weight of the coated cloth.

The plastic ingredient of the plug and/or receptacle body of the electrical connector can be any high polymeric synthetic substance, excluding the rubbers, which include thermoplastic and thermosetting types, that are capable of flowing under heat and pressure at one time or another. Suitable thermoplastic type materials are un-filled, filled or glass fiber reinforced nylon, polyethylene, polypropylene, polycarbonate, thermoplastic polyesters, polyphenylene oxide based materials, polysulfone, fluorinated polymers and the like. Suitable thermosetting type plastic materials are filled and fiber reinforced diallyl phthalate, epoxy, phenol-formaldehyde, melamine-formaldehyde, urea-formaldehyde, unsaturated polyester resins and the like.

The presently preferred method of making the glass cloth reinforced plastic electrical connector will now be described. First, open mesh glass cloth of a suitable type as described above, is treated with an uncured thermosetting resin coating in an amount which ranges between 20 and 50 percent of the weight of the coated cloth. The preferred amount of coating is between 25 and 45 percent by weight of the coated cloth.

Thermosetting resin coated open mesh glass cloth is shaped by wrapping one or more layers of the cloth about a mandrel having the desired shape which approximates the shape of the section of the plastic plug and receptacle which is to be reinforced. The cloth is then overwrapped, under tension, with a suitable release film. The entire assembly is then subjected to heat for a sufficient period of time to cure the thermosetting resin coating to the insoluble and infusible state, substantially maintaining the relative positions of the glass fibers in the open mesh glass cloth. The shaped cured resin open mesh glass reinforcement is removed from the mandrel and placed on or over a suitable cored section in the mold used to produce the plastic plug or receptacle body. Shaped cured thermosetting resin coated glass cloth reinforcement suited to the reinforcement of plastic plugs and receptacles may have as many as six plies of glass cloth depending on the type of open mesh glass cloth and type of plastic being molded about the reinforcement. The preferred shaped cured thermosetting resin coated open mesh glass cloth reinforcement is that which contains between 1 and 4 plies of glass cloth.

The reinforcements are preferably located in those sections of the plastic plug and receptacle bodies which are exposed to high stress levels and use. The placement of the reinforcement is preferably at or adjacent to the inner wall section of the part to be reinforced. Support for the reinforcement is available in that part of the mold in the form of mold cores which form the inner walls of the molded part. The shaped reinforcement only has to be placed on or over the comparably shaped core section of the mold that forms the inner wall of the part. Further, location of the reinforcement at or near the inner wall of the molded part provides greater assurance for obtaining maximum reinforcing action to the part because the reinforcement when located here is less subject to damage from external forces.

The molding process to manufacture plastic plugs and receptacles reinforced with cured thermosetting resin coated open mesh glass cloth is carried out in a machine suited to injection of a plastic material into a mold. The process consists of placement of the suitably shaped and properly sized cured resin coated open mesh glass cloth reinforcement on a similarly shaped and sized core section of the open mold. The mold is then closed in the machine. The plastic material is now injected under heat and pressure into the mold cavity on and about the shaped open mesh glass cloth reinforcement. The molded plastic plug and/or receptacle having the reinforcement molded in is then removed from the mold.

Machines for injecting plastic material are available commercially and are designated both as injection machines and as transfer machines. Both thermoplastic and thermosetting plastic materials are processed on injection machines whereas only thermosetting plastic materials are normally processed on transfer machines. It should be noted that process conditions, other than the relatively high force, which are in the 15,000 pound to 50,000 pound range used to inject the plastic material, differ from molding thermoplastic type and thermosetting type plastic materials. In general, the thermoplastic type material must be heated to higher temperatures than the thermosetting type plastic for injection of the plastic into the mold. Mold temperatures on the contrary must be lower for the thermoplastic type than for the thermosetting type to permit rapid solidification of the thermoplastic type material in said mold. The higher mold temperatures required by the thermosetting type plastic material is to bring about the chemical conversions of this material to the insoluble and infusible state.

The following are examples of the above process and product of the invention. Details are given below on typical materials and methods used to produce both suitably shaped cured resin coated open mesh glass reinforcements and for producing industrial heavy duty plastic plug and receptacle bodies or body components reinforced with cured resin open mesh glass cloth.

EXAMPLE 1

Shaped Open Mesh Glass Cloth Reinforcement

A metal cylinder having attached to it a layer of glass fabric coated with fluorocarbon resin release agent such as "TFE-Glass" material supplied by TACONIC PLASTICS, PETERSBURG, N.Y. The outside diameter of this prepared metal cylinder is slightly larger than the diameter of the core section of the mold for the plastic material over which the cured resin coated open mesh glass cloth cylinder is to be placed.

A piece of uncured phenol-formaldehyde coated open mesh glass cloth is provided of sufficient length to give slightly more than a double wrap about the aformentioned prepared metal cylinder. The phenol-formaldelhyde resin is a typical one stage resin which after having been applied to the open mesh cloth was heated to bring the coating to a relatively non-tack condition. The resin coating is approximately 35% by weight of the coated open mesh glass cloth. The open mesh glass cloth is a "Plain Weave" cloth, 0.023" thick, having a glass content of 30% by volume of the glass cloth and a tensile strength of approximately 500 pounds per inch.

The above piece of uncured phenol-formaldehyde coated open mesh glass cloth is wrapped in a double layer around the outside diameter of the prepared metal cylinder. This double layer of coated glass cloth is then overwrapped, under tension, to knit the plies together when heated, with a glass fabric coated fluorocarbon resin release tape.

The entire assembly is then placed into an oven and heated for 1-3 hours at 350° F. to cure the resin coating on the open mesh glass cloth.

The assembly is removed from the oven and allowed to cool to room temperature. The glass fabric release tape is removed and the cured resin two ply open mesh glass cloth cylinder is stripped from the prepared mandrel.

The same procedure is used to provide shaped cured resin coated open mesh glass cloth reinforcements wherein other uncured thermosetting resins such as epoxy, unsaturated polyester resins and the like are the coatings on the open mesh glass cloth prior to shaping and curing.

Figure 2:
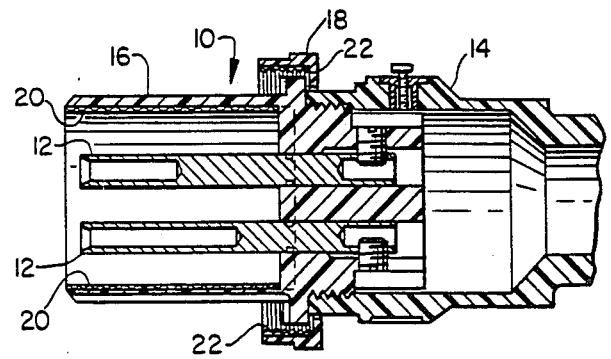
FIG. 2 is a cross-sectional view of the plug component taken along line 2—2 of FIG. 1.

Examples 2 and 3 illustrate the manufacture of industrial heavy duty thermoset plastic plug and receptacle bodies reinforced with cured resin coated open mesh glass cloth. Heavy duty plastic plug and receptacle bodies as shown in FIG. 1 and FIG. 2 were produced having the inner wall section of the cylindrical protective shells reinforced with cured resin coated open mesh glass cloth.

EXAMPLE 2

Two poly cured phenol-formaldehyde resin coated open mesh glass cloth cylinders are provided in accord with the method of preparation given above. The open mesh glass cloth used in these cylinders was a "Leno Weave" cloth, 0.022" thick, having a glass content of 25% by volume of the glass cloth and a tensile strength of approximately 350 lbs. The inside diameter of these glass cloth cylinders was 0.060" larger than the diameter of the small and of the tapered core in the mold used to form the plug and receptacle cylindrical inner wall sections.

A mold is provided having cavities and core sections to produce the desired plastic plug and receptacle bodies. This mold also is so constructed as to accept a charge of plastic material in a suitable chamber of cylindrical shape and which is separated from the mold cavities and core sections where the molded part is produced. The material chamber is connected to the cavities by small channels through which, when the mold is closed, the plastic material is injected into the mold cavities.

The mold consists of two half sections, one of which is connected to a movable platen and the other to a fixed platen of a transfer machine. The transfer machine has a movable hydraulic ram which closely fits the material charge chamber in the mold.

The mold and the material chamber are heated in the transfer machine to approximately 300° F.

With the heated mold in the open position, suitably sized two ply cured phenol-formaldehyde coated open mesh glass cloth cylinders are placed on the tapered cylindrical core sections of the plug and receptacle molds. The mold is closed in a transfer machine and held closed under a force of approximately 100 tons.

A typical filled, glass reinforced unsaturated thermosetting polyeSster resin molding material commercially designated as a chemically thickened "Sheet Molding Compound" was provided for producing the plastic plug and receptacle body.

This chemically thickened "Sheet Molding Compound" had the following formulation and method of preparation.

| SHEET MOLDING COMPOUND | |
| --- | --- |
| Ingredient | Parts By Weight |
| Unsaturated Isophthalic Polyester Resin | 65 |
| Unsaturated Halogenated Polyester Resin | 35 |
| Peroxide Catalyst | 0.75 |
| Zinc Stearate | 3 |
| Antimony Oxide | 2 |
| Aluminum Trihydrate | 100 |
| Pigment | 2 |
| Magnesium Oxide Thickener | 2.8 |
| ½" Glass Fibers | 60 |

All the ingredients except the glass fibers were placed into a mixer and mixed for 2-3 minutes. The mixture was divided in half and each half spread in a thin layer on 5 mil polyethylene plastic film. The ½" glass fibers were distributed over one of the thin films of resin and the two films were combined under slight pressure to form a sheet wherein the glass fibers were wet by the resin mixture. The sheet so formed was allowed to stand for 14 days at slightly above room temperature at which time the chemcial thickening of the resin had taken place providing a semi-soft tack free molding material. The polyethylene films were removed and the molding material weighed to the proper mold charge weight for the parts to be produced.

A two lb. 14 oz. mold charge of the "Sheet Molding Compound" so prepared was placed into the heated material chamber in the closed mold in the transfer machine.

The movable hydraulic ram in the transfer machine was actuated, and after entering the material chamber in the mold, exerted a force of between 15 to 20 tons on the heated material in the material chamber which causes the material to be injected over a period of 20 to 22 seconds through the small connecting channels in the mold into the mold cavities and around and about the cured resin open mesh glass cloth reinforcement located on the core sections of the mold which form the cylindrical parts of the plastic plug and receptacle bodies.

The mold is kept closed under pressure for 8-10 minutes to effect cure of the thermosetting unsaturated polyester resin "Sheet Molding Compound".

The mold is opened and the cured plastic plug and/or receptacle body parts reinforced with the cured phenol-formaldenhyde resin open mesh glass cloth cylinder are ejected from the mold.

EXAMPLE 3

The same molding procedure, mold and transfer machine as described in Example 2 were used to produce plastic plug and receptacle bodies from a filled, glass reinforced unsaturated thermosetting polyester resin molding material commercially designated as "Bulk Molding Compound" and reinforced with cured epoxy resin coated open mesh glass cloth.

The shaped cured resin coated open mesh glass cloth reinforcement used was prepared from two plies of an uncured epoxy resin coated "Plain Weave" glass cloth, 0.023" thick, having a glass content of 30% by volume of the glass cloth and a tensile strength of approximately 580 lbs. per inch.

The "Bulk Molding Compound" used had the following formulation and method of preparation.

| BULK MOLDING COMPOUND | |
|---|---|
| Ingredients | Parts By Weight |
| Unsaturated Orthophthalic Polyester Resin | 100 |
| Powdered Polyethylene Resin | 6 |
| Aluminum Trihydrate | 210 |
| Peroxide Catalyst | 1 |
| Zinc Stearate | 3.5 |
| Pigment | 5 |
| ¼" Glass Fibers | 1 |

All the ingredients except the glass fibers were placed into a mixer and mixed for 2-3 minutes. The glass fibers were added and mixed for 1-2 minutes. The material upon removal from the mixer was ready for molding.

A two lb. 15½ oz. mold charge of the above "Bulk Molding Compound" was charged into the heated material chamber in the closed mold and injected on and around the shaped cured epoxy resin coated open mesh glass cloth cylinder located on the core section of the closed mold.

The injected "Bulk Molding Compound" thermosetting plastic in the mold was allowed to cure for nine minutes prior to ejecting the cured plastic plug and receptacle body parts reinforced with cured epoxy resin coated open mesh glass cloth.

Example 4 illustrates the manufacture of internally threaded thermoplastic resin plug and receptacle component parts reinforced with cured thermosetting resin coated open mesh glass cloths.

EXAMPLE 4

Figure 5:
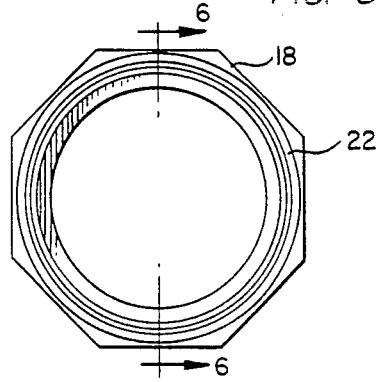
FIG. 5 is a front view of the coupling nut of the electrical connector of the invention.
Figure 6:
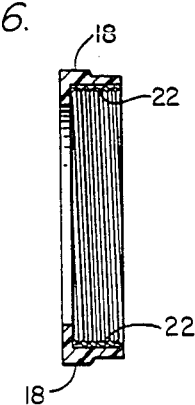
FIG. 6 is a cross-sectional view of the coupling nut taken along line 6—6 of FIG. 5.

An internally threaded plastic plug and receptacle body coupling nut component part as shown in FIGS. 5 and 6 was produced with thermoplastic type resins and reinforced with a variety of cured resin coated open mesh glass cloth cylinders in the molding process.

The mold used had the same basic construction as given in Example 2 for producing plastic plug and receptacle bodies. An adapter was provided for the material chamber in the mold to accept a nozzle in the injection machine which delivers the molten thermoplastic material.

The injection machine used was 40 oz., 400 ton clamp, conventional reciprocating screw type machine having a heated barrel through which thermoplastic material is heated to the molten state and to which a nozzle is connected for delivery of the molten thermoplastic material to the mold.

Polypropylene and glass reinforced polypropylene thermoplastic materials were used to produce the threaded component parts reinforced with cured resin coated open mesh glass cloth. The polypropylene material was manufactured by REXINE POLYOLEFINS CO., DIV. OF DART INDUSTRIES and designated as "Rexine A-P-11". The glass reinforced poly-propylene was manufactured by FIBERFIL DIV., DART INDUSTRIES and designated as "Profil J 60/20".

The molding procedure for the thermoplastic resin materials was, in general, the same as that used for the thermosetting resins materials. This consisted of placement of the open mesh glass cloth reinforcing cylinder on the threaded core section of the mold while the mold was open and then closing the mold in the injection machine. The molten thermoplastic resin material is then injected into the mold on and about the reinforcing material in the mold. The cured open mesh glass cloth reinforced thermoplastic resin parts were then removed from the core sections of the opened mold.

The table on the following page lists the thermoplastic resin materials and the type of uncured coated resin open mesh glass cloth used to make the cured resin coated open mesh glass cloth cylinders for reinforcement of the thermoplastic resin plug and receptacle component parts.

| Thermoplastic Material | Cured Resin Coated Open Mesh Glass Reinforcement | | |
|---|---|---|---|
| | Glass Cloth | | |
| | % Glass By Volume | Tensile Strength Lbs./In. | Thermosetting Resin Coating |
| Polypropylene | 30 | 580 | Phenol-formaldehyde |
| Polypropylene | 30 | 580 | Epoxy |
| Polypropylene | 37 | 470 | Epoxy |
| Glass Reinforced Polypropylene | 30 | 580 | Phenol-formaldehyde |
| Glass Reinforced Polypropylene | 37 | 470 | Epoxy |
| Glass Reinforced Polypropylene | 25 | 360 | Unsaturated Polyester Resin |

Other embodiments of the invention will be apparent to those skilled in the art in consideration of the specification and practice of the invention disclosed herein. It is intended that the specification and examples be considered as exemplary only, with a true scope and spirit of the invention being indicated by the following claims.

What is claimed is:

1. A reinforced protective housing comprising an injection molded plastic body and a preformed resin coated open mesh glass cloth reinforcement substantially embedded in said molded plastic body, said body comprising a thermoplastic or thermosetting plastic material molded under conditions of elevated pressure and elevated temperature rendering said material molten, the resin coating covering said glass cloth and being a thermosetting resin cured to the insoluble and infusible state prior to said plastic material being injection molded on, through and about said glass cloth, and said coated open mesh glass cloth reinforcement being embedded in said molded plastic body substantially uniformly and substantially without distortion over the reinforced area.

2. A plastic housing according to claim 1 where the housing protects electrical components.

3. A reinforced housing according to claim 1 wherein said open mesh glass cloth has a glass fiber content of from about 15% to about 50% by volume.

4. A reinforced housing according to claim 3 wherein the molded plastic comprises a major constituent by volume and the resin coated open mesh glass cloth reinforcement comprises a minor constituent by volume of said housing.

5. A reinforced housing according to claim 1, wherein the thermosetting resin coating on the open mesh glass cloth is present in the range between 20 and 50% of the weight of the coated cloth.

6. An electrical connector component comprising a composite plastic body; said composite plastic body including: (a) an injection molded plastic portion comprising a thermoplastic or thermosetting plastic material molded under conditions of elevated pressure and elevated temperature rendering said material molten, and (b) a preformed open mesh glass cloth reinforcement substantially embedded in the molded plastic material during the injection molding of said component, said glass cloth having a glass fiber content of from about 15% to about 50% by volume and having a thermosetting resin coating thereon, said coating being applied to cover said cloth in an uncured state in an amount ranging from about 20% to about 50% of the weight of the coated cloth and said coating being cured to the insoluble and infusible state prior to being embedded in the molded plastic material; said coated open mesh glass cloth reinforcement being embedded in said molded plastic material substantially uniformly and substantially without distortion over the reinforced area.

7. An electrical connector according to claim 6 wherein said composite plastic body comprises the molded plastic material as the major constituent and the cured thermosetting resin coated open mesh glass cloth reinforcement for the molded plastic material as the minor constituent.

8. An electrical connector according to claim 6 wherein electrical contacts are molded into the connector component.

9. An electrical connector according to claim 6 wherein electrical contacts are assembled into the composite plastic body.

10. An electrical connector according to claim 6, wherein the molded plastic constituent of the composite plastic is a thermoplastic type material.

11. An electrical connector according to claim 10, wherein said thermoplastic type material is selected from unfilled, filled, or glass fiber-reinforced polyethylene, polypropylene, polycarbonate, thermoplastic polyesters, polyphenylene-oxide base materials, polysulfone, fluorinated polymers, and nylon.

12. An electrical connector according to claim 6, wherein the injection molded plastic material of the composite plastic body is a thermosetting resin.

13. An electrical connector according to claim 12, wherein the injection molded thermosetting type plastic is selected from the group of filled and fiber-reinforced diallyl phthalate, epoxy, phenol-formaldehyde, melamine-formaldehyde, urea-formaldehyde, and unsaturated polyester resins.

14. An electrical connector according to claim 10, wherein the thermoplastic type material used is polypropylene.

15. An electrial connector according to claim 10, wherein the thermoplastic type material is glass-reinforced polypropylene.

16. An electrical connector according to claim 12, wherein the injection molded plastic material is a sheet molding compound comprising a chemically thickened glass reinforced unsaturated polyester resin molding compound.

17. An electrical connector according to claim 12, wherein the injection molded thermosetting plastic material is a bulk molding compound comprising a highly filled glass reinforced unsaturated polyester resin molding compound.

18. An electrical connector according to claim 6, wherein the open mesh glass cloth has a percentage by volume of the glass fibers in the glass cloth of no greater than 50% of the volume of the glass cloth and the tensile stength of the open mesh glass cloth is greater than 100 lbs. per inch.

19. An electrical connector according to claim 6, wherein the percentage by volume of the glass fiber falls in the range of 15 to 40% of the volume of the glass cloth.

20. An electrical connector according to claim 6, wherein the cured thermosetting resin coating for the open mesh glass cloth is selected from the group consisting of phenol-formaldehyde, epoxy, diallyl phthalate, unsaturated polyesters, urea-formaldehyde, and melamine-formaldehyde resins.

21. An electrical connector according to claim 6, wherein the thermosetting type resin coating for the open mesh glass cloth is selected from the group consisting of phenol-formaldehyde, epoxy, and unsaturated polyester resins.

22. An electrical connector according to claim 20, wherein the amount of thermosetting resin coating on the open mesh glass cloth is between about 25 and 45% by weight of the coated cloth.

23. An electrical connector according to claim 6, wherein the resin coated open mesh glass cloth reinforcement is located in those sections of the component which are exposed to high stress levels in use.

* * * * *